(12) United States Patent
Fert et al.

(10) Patent No.: US 9,981,751 B2
(45) Date of Patent: May 29, 2018

(54) CASING FOR A PROPULSION UNIT (71) Applicant: SNECMA, Paris (FR)

(72) Inventors: Jeremy Edmond Fert, Paris (FR); Julien Pavillet, Epinay Sous Senart (FR)

(73) Assignee: SNECMA, Paris (FR)

( * ) Notice: Subject to any disclaimer, the term of this patent is extended or adjusted under 35 U.S.C. 154(b) by 476 days.

(21) Appl. No.: 14/576,694

(22) Filed: Dec. 19, 2014

(65) Prior Publication Data

US 2015/0175269 A1  Jun. 25, 2015

(30) Foreign Application Priority Data

Dec. 19, 2013  (FR) ...................................... 13 62957

(51) Int. Cl.
| | |
|---|---|
| *B64D 29/06* | (2006.01) |
| *B64D 27/10* | (2006.01) |
| *B64D 33/08* | (2006.01) |
| *F01D 25/24* | (2006.01) |
| *F02K 3/04* | (2006.01) |
| *F02C 7/18* | (2006.01) |
| *F02C 7/32* | (2006.01) |

(52) U.S. Cl.
CPC ............. *B64D 29/06* (2013.01); *B64D 27/10* (2013.01); *B64D 33/08* (2013.01); *F01D 25/24* (2013.01); *F02C 7/18* (2013.01); *F02C 7/32* (2013.01); *F02K 3/04* (2013.01); *F05D 2230/72* (2013.01); *F05D 2260/213* (2013.01); *Y02T 50/672* (2013.01); *Y02T 50/676* (2013.01)

(58) Field of Classification Search
CPC ........ B64D 29/00; B64D 29/06; B64D 29/08; B64D 27/10; B64D 33/08; F01D 25/24; F02C 7/18; F02C 7/32; F02C 7/14; F02K 3/04; F02K 1/805; F05D 2230/72; F05D 2260/213; F05D 2240/14; Y02T 50/672
See application file for complete search history.

(56) References Cited

U.S. PATENT DOCUMENTS

| 7,351,174 B2 | 4/2008 | Beutin et al. | |
|---|---|---|---|
| 8,408,008 B2 * | 4/2013 | Todorovic | ............... F01D 11/24 60/782 |

(Continued)

FOREIGN PATENT DOCUMENTS

| EP | 1 568 868 A2 | 8/2005 |
|---|---|---|
| EP | 1 795 708 A2 | 6/2007 |

(Continued)

OTHER PUBLICATIONS

U.S. Appl. No. 14/479,820, filed Sep. 8, 2014, Kohn, et al.

(Continued)

*Primary Examiner* — Justin Seabe
*Assistant Examiner* — Behnoush Haghighian
(74) *Attorney, Agent, or Firm* — Oblon, McClelland, Maier & Neustadt, L.L.P.

(57) ABSTRACT

An aircraft propulsion unit comprising an engine and a nacelle including an axisymmetric casing (16) delimiting an air flow path, wherein this casing has at least two openings closed by removable and interchangeable panels (18), at least one of these panels carrying one component (24) of the propulsion unit.

10 Claims, 5 Drawing Sheets

(56) References Cited

U.S. PATENT DOCUMENTS

| | | | | |
|---|---|---|---|---|
| 8,739,516 B2* | 6/2014 | Bulin | .................. | F02C 7/14 |
| | | | | 60/226.1 |
| 2005/0172609 A1* | 8/2005 | Beutin | .................. | F02C 7/20 |
| | | | | 60/226.1 |
| 2005/0247043 A1* | 11/2005 | Derenes | ............. | F01D 9/065 |
| | | | | 60/226.1 |
| 2007/0130912 A1 | 6/2007 | Kraft et al. | | |
| 2008/0053059 A1 | 3/2008 | Olver et al. | | |
| 2008/0072572 A1* | 3/2008 | Beutin | ............. | B64D 29/08 |
| | | | | 60/246 |
| 2008/0230651 A1* | 9/2008 | Porte | ............. | B64D 13/06 |
| | | | | 244/118.5 |
| 2011/0189007 A1* | 8/2011 | Presz, Jr. | ............ | F01D 25/24 |
| | | | | 415/208.1 |
| 2012/0087784 A1* | 4/2012 | Widener | .......... | F01D 5/085 |
| | | | | 415/180 |
| 2012/0111995 A1* | 5/2012 | Lafont | ............. | B64D 29/00 |
| | | | | 244/54 |
| 2013/0247587 A1* | 9/2013 | Lo | ............. | F01D 17/105 |
| | | | | 60/806 |
| 2016/0312702 A1* | 10/2016 | Thomas | .......... | F02C 7/18 |

FOREIGN PATENT DOCUMENTS

| | | | |
|---|---|---|---|
| EP | 1 898 069 A2 | 3/2008 | |
| EP | 1 902 952 A1 | 3/2008 | |
| EP | 2 128 023 A1 | 12/2009 | |
| EP | 2128023 A1 * | 12/2009 | ............. B64D 13/00 |

OTHER PUBLICATIONS

French Preliminary Search Report dated Sep. 25, 2014 in French Application 13 62957, filed on Dec. 19, 2013 (with English Translation of Categories of Cited Documents and Written Opinion).

* cited by examiner

CASING FOR A PROPULSION UNIT

TECHNICAL DOMAIN

The present invention relates to an axisymmetric casing for an aircraft propulsion unit, and to an aircraft propulsion unit incorporating such a casing.

PRIOR ART

The prior art includes for example the following documents: EP-A1-1 902 952, EP-A2-1 568 868, EP-A1-2 128 023 and EP-A2-1 898 069.

An aircraft propulsion unit includes a nacelle and a turbine engine, the nacelle including an axisymmetric casing delimiting an annular path for an air flow referred to as the secondary air flow in the case of a dual-flow turbine engine. The nacelle defines an annular space about the casing. Certain components of the turbine engine are assembled in the nacelle, i.e. in the aforementioned space, and may be attached to the casing of same. The external wall of the nacelle may include removable covers to enable access to these components during maintenance operations.

An aircraft is usually fitted with at least two lateral propulsion units, i.e. two propulsion units that are located on the sides of the fuselage of the aircraft and that are attached to this fuselage or to the wings by means of masts. Aircraft manufacturers may require certain components of the propulsion unit to be located on the fuselage side of the airplane. This is for example a case if this equipment includes a visible part on the external wall of the nacelle. Aircraft manufacturers may indeed prefer that this visible part be located on the fuselage side to make it less visible, thereby improving the aesthetic appearance of the propulsion unit. If this is the case, the position of the equipment on the casing of one of the aircraft propulsion units is different from the position of the equipment on the casing of the other propulsion unit, which results in propulsion units with different casings. Indeed, in the prior art, the casing of a propulsion unit includes a predefined equipment installation zone, and it is not possible to use a given casing for a propulsion unit in which this equipment is not installed in the same position. In the prior art, a workaround is used to resolve this problem.

The present invention notably provides a simple, effective and economic solution to this problem.

DESCRIPTION OF THE INVENTION

The invention proposes an aircraft propulsion unit comprising an engine and a nacelle including an axisymmetric casing delimiting an air flow path, the propulsion unit also including at least one component, characterized in that said casing has at least two openings closed by removable and interchangeable panels, at least one of these panels carrying said at least one component.

The present invention is particularly advantageous in that, unlike in the prior art, the casing of the nacelle is designed to accommodate a component in a position chosen from several possible positions. These positions are defined by the openings in the casing, of which there are at least two. The panel carrying the component can be used to close either one of these openings. The equipment can therefore be mounted beside either one of the openings of the casing as a function of the desired position, for example as determined by an aircraft manufacturer. The lateral propulsion units on either side of the fuselage of a given aircraft can therefore be fitted with identical empty casings, with only the positions of the removable panels carrying the equipment being different from one casing to the other. One advantage of the invention is to reduce the manufacturing cost of a set of aircraft engine nacelle casings: since the casings are identical, a single mold can be used to manufacture them.

The advantage of the removable panels carrying a component is obvious, in particular if the dimensions of this component require a widening in the casing, and it is therefore essential that this component can be positioned in several possible locations as a function of the layout used. This means that widening the flow path is only required where the component is installed, and that the internal surface of the casing delimiting the flow path can be faithfully reconstituted using panels with no equipment (closing panel) in the positions where no equipment is installed. Furthermore, this can sometimes facilitate assembly/disassembly if assembly/disassembly of the panel is simpler than assembly/disassembly of the equipment carried by the panel. The openings in the casing can be located substantially in a single transverse plane. They can be offset from one another by a predetermined angle in relation to the longitudinal axis of the casing.

The openings can be located in the recesses of the casing.

At least one of the panels can form a seat recess for the equipment. This recess can facilitate incorporation of the equipment into the nacelle, in particular if the equipment is bulky.

In one specific embodiment of the invention, the component is a pre-cooler heat exchanger for supplying air to the aircraft.

On board an aircraft, hot air is required to carry out certain functions, such as conditioning the air in the cockpit and in the cabin, or deicing certain components of the aircraft. This hot air comes from the propulsion units of the aircraft and has to be significantly cooled before it can be used. To do so, at least one heat exchanger is provided, generally referred to as a pre-cooler, in which the hot air taken from the engine of the propulsion unit is cooled using colder air taken from the secondary flow path or the fan duct of this propulsion unit. In the prior art, this heat exchanger is mounted on the linking mast of the propulsion unit of the aircraft. This heat exchanger has a first air circuit, the inlet of which is linked by a duct to means for drawing hot air from the engine and the outlet of which is linked to the air-conditioning means of the aircraft. The heat exchanger includes a second air circuit that is supplied with air taken from the fan duct of the propulsion unit, this air being subsequently discharged to the outside following heat exchange with the air in the primary circuit, in order to cool same.

The heat exchanger may include an air scoop in the air flow that is attached to one of the aforementioned panels of the casing.

This scoop can be partially embedded in the casing or the panel and may include a protruding portion on the internal surface of the casing or the panel.

The two openings are preferably substantially identical.

The casing may be non-axisymmetric. It may have, substantially in a single transverse plane, two recesses at which are located said openings respectively.

The present invention also relates to a system for a propulsion unit as described above, including a pre-cooler heat exchanger and two removable panels designed to close the openings of a axisymmetric nacelle casing, characterized in that the heat exchanger is rigidly attached to one of said panels.

DESCRIPTION OF THE FIGURES

The invention can be better understood from, and other details, features and advantages of the invention are set out in, the description below, given by way of non-limiting example and with reference to the attached drawings, in which:

FIG. 6 is a schematic axial cross section of the heat exchanger in FIG. 5, FIGS. 7 and 8 are schematic perspective views of another nacelle casing according to the invention, FIG. 7 showing the equipment group supported by a removable panel that is interchangeable with another panel, and FIG. 8 showing the same view without the equipment group, in which one panel has a widening and the neighboring panel does not.

DETAILED DESCRIPTION

Figure 1:
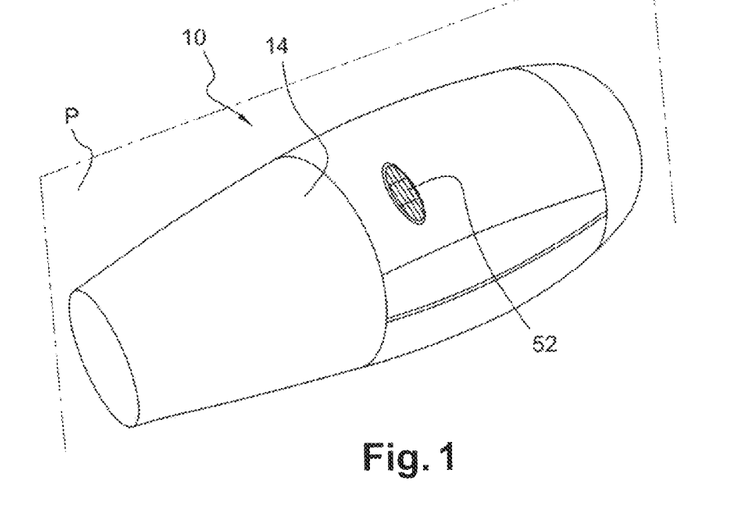
FIGS. 1 and 2 are schematic perspective views of two aircraft propulsion units.
Figure 2:
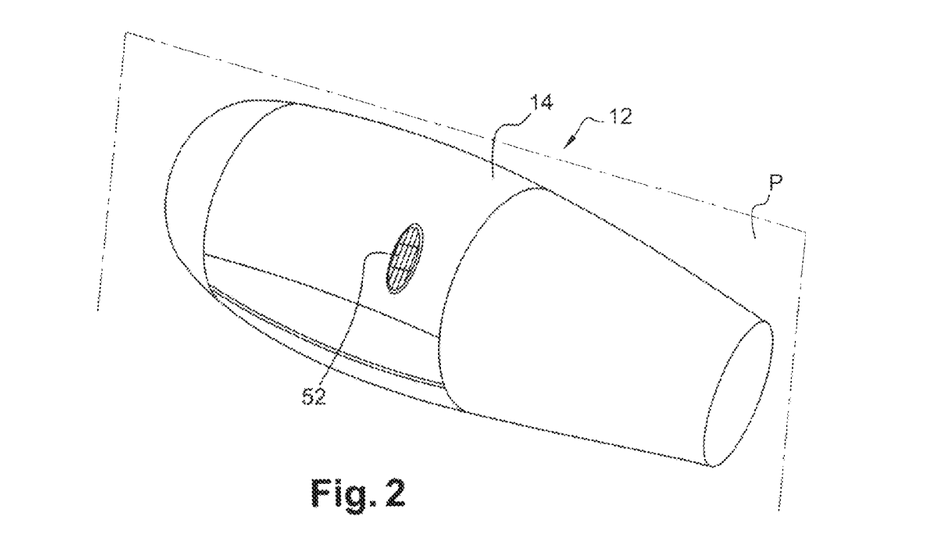

Reference is first made to FIGS. 1 and 2, which show two propulsion units 10, 12 according to the invention that can be fitted to a single aircraft, each of these propulsion units being attached by means of a mast (not shown) to a wing or to one side of the fuselage of the aircraft.

These propulsion units 10, 12 are in this case dual-flow. They each include an engine (not shown) surrounded by a nacelle 14, the engine defining a first annular flow path for a primary flow and a second flow path for a secondary flow.

The engine typically includes, considered in the upstream-downstream direction of the flows, a fan, at least one compression module, a combustion chamber, at least one turbine module, and a combustion-gas exhaust nozzle.

Figure 3:
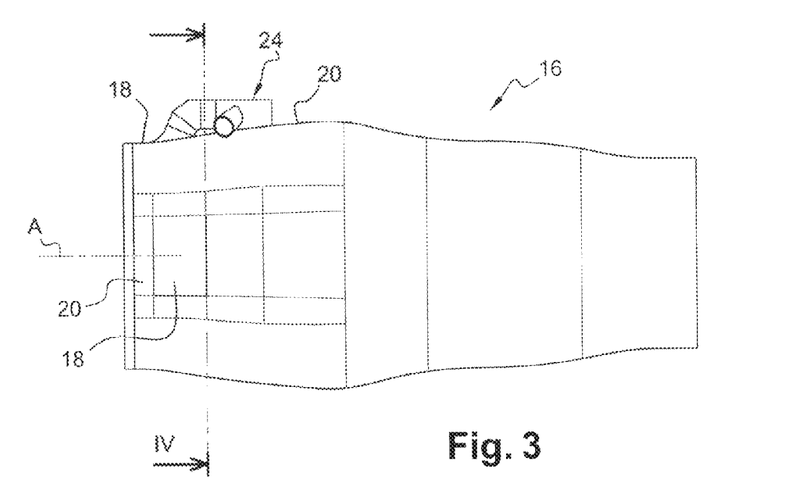
FIG. 3 is a schematic perspective view of a nacelle casing of a propulsion unit according to the invention.
Figure 4:
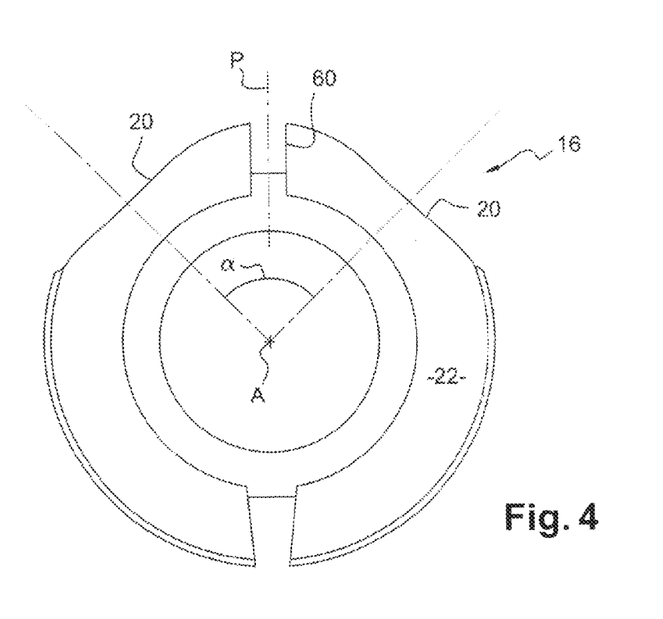
FIG. 4 is a schematic cross section taken along the line IV-IV in FIG. 3, in which the casing has two recesses in the flow path.

The nacelle 14 has an external wall that can be seen in FIGS. 1 and 2, this external wall surrounding an axisymmetric casing 16, which can be seen in FIGS. 3 and 4. The equipment is mounted in the annular space delimited by the external wall and the casing 16 of the nacelle 14.

The invention enables the propulsion units 10, 12 to be fitted with identical casings 16, which was not possible in the prior art, in particular if two identical components occupy different positions on the propulsion units of the aircraft.

To achieve this, the casing 16 includes at least two radial through-openings that are closed by removable interchangeable panels 18 (FIG. 3). The panels 18 are removable, which means they can be taken off the casing 16, for example during maintenance work. They are also interchangeable, which means that each opening can be closed by either one of the panels 18, the shapes and dimensions of which are substantially identical and corresponds substantially to the shapes and dimensions of the openings of the casing.

In the example shown, the panels 18 close the substantially rectangular openings. These openings are located away from the upstream and downstream extremities of the casing 16 and include an upstream peripheral edge, a downstream peripheral edge and two lateral peripheral edges.

The openings in the casing 16 are located substantially in a single transverse plane, i.e. the upstream peripheral edges of same are located on a single circumference and the downstream peripheral edges of same are located on another single circumference, these circumferences being centered on the longitudinal axis A of the casing 16.

The openings are in this case offset angularly from one another by an angle α of approximately 70-100°, in a plane perpendicular to the axis A. In the example shown, the openings are positioned symmetrically in relation to the plane P (see FIG. 4).

In the example shown, the casing 16 has a non-axisymmetric shape and includes two recesses 20 level with the openings of same (FIG. 3). These recesses 20 result in local reductions in the radial dimension of the flow path 22 of the secondary flow of the propulsion unit. The casing 16 also narrows level with the recesses 20.

The casing 16 is preferably made of a composite material using an appropriately shaped mold. Consequently, the shape of the mold need simply be adapted to create this type of non-axisymmetric casing (with local deformations). Alternatively, the casing may be made of a metal alloy, and formed by casting.

One of the panels 18 is linked to a component of the propulsion unit. In the example shown, this component is a pre-cooler volume heat exchanger 24.

As explained in the foregoing, hot air drawn from the engine is cooled using this type of heat exchanger and is supplied to the aircraft to perform certain functions, such as conditioning the air in the cockpit and cabin, or deicing certain components of the aircraft.

Figure 5:
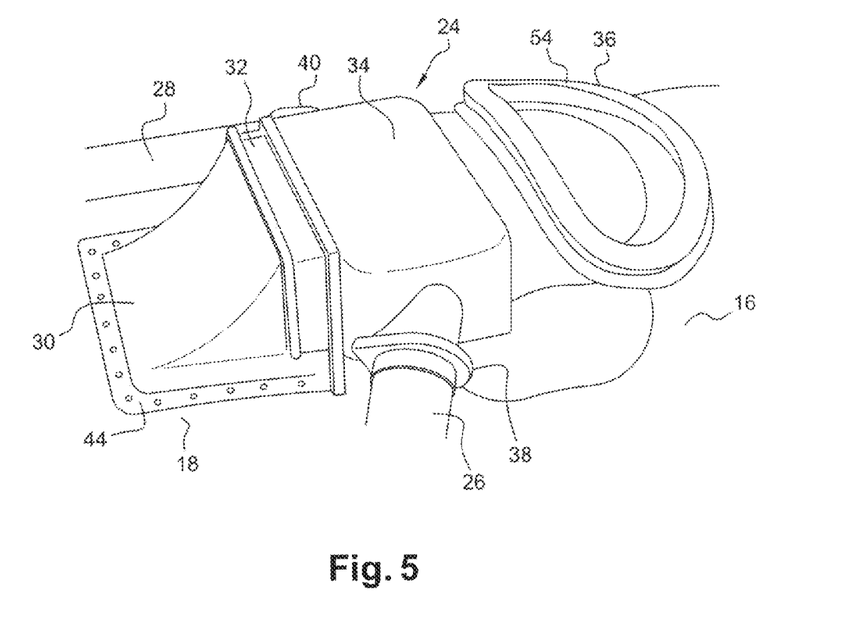
FIG. 5 is a schematic perspective view of a pre-cooler volume heat exchanger fitted with an air inlet scoop and an exhaust pipe for the cooling flow.
Figure 6:
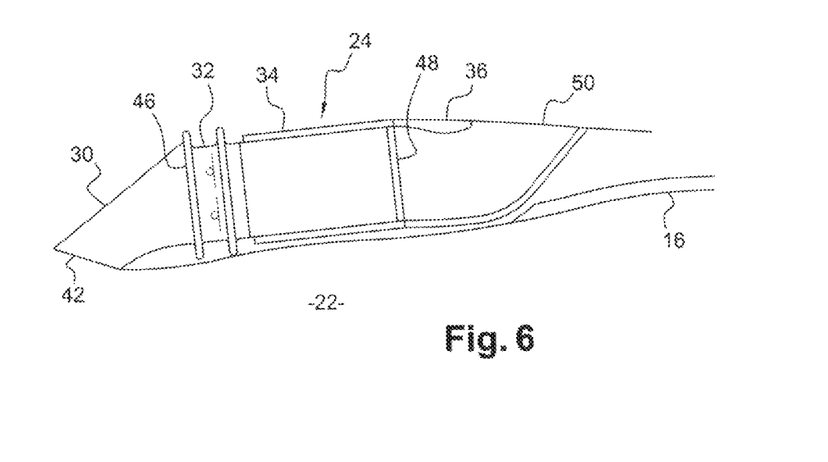

The heat exchanger 24, which can be better seen in FIGS. 5 and 6, has two circuits, respectively primary and secondary circuits. The primary circuit, also referred to as the hot circuit, has an inlet linked by at least one duct 26 to means for drawing hot air from the engine (for example in a compression module), and the outlet from this primary circuit is linked by at least one other duct 28 to means for supplying hot air to the aircraft.

The secondary circuit, also referred to as the cold circuit, has an inlet linked to means for drawing air from the secondary flow of the propulsion unit, and the outlet from this circuit is linked to means for discharging the air outside the propulsion unit.

In the example shown, the heat exchanger 24 essentially includes six elements: a scoop 30 forming said means for drawing air from the secondary flow, a flow rate adjustment valve 32 for the air flowing through the secondary circuit, a volume heat exchange block 34 comprising for example bricks defining said primary and secondary circuits, a nozzle 36 forming the means for discharging air from the secondary circuit, and air inlet and air outlet collectors 38, 40 respectively of the primary circuit. The direction of the flow can be inverted in the pre-cooler as a function of the position on the propulsion unit. Accordingly, the air inlet 38 can become an air outlet, and vice versa for the air outlet 40.

In this case, the scoop 30 is attached by bolting via the rigidly attached flange 44 directly to the removable panel 18. It includes an inlet 42 or mouth that is surrounded by a peripheral flange 44 applied and attached to the external surface of the casing 16. In the example shown, this inlet 42 of the scoop 30 communicates with an orifice of the panel 18 and opens out mostly radially (and preferably at an angle that facilitates the ingress of the flow into the scoop) towards the inside of the flow path 22 of the secondary flow (FIG. 3). The outlet 46 of the scoop 30 is oriented substantially axially downstream. Alternatively, the scoop 30 and the removable panel 18 could be made from a single part. The heat exchanger 24 may be attached to the panel 18 using attachment means linking a supporting flange of the valve 32 to the scoop 30.

The valve 32 is mounted directly downstream of the scoop 30. This is for example a valve having two clappers that can be moved in rotation about transversal axes from a position closing the flow area of the valve to a position opening this flow area, the valve being controlled by a cylinder and a system of link rods (not shown).

The volume heat exchange block 34, also referred to as a brick heat exchanger, may be of the type used in the prior art for this purpose.

The nozzle 36 is mounted directly on the outlet of the secondary circuit of the block 34, the inlet 48 of same opening out mostly axially upstream and the outlet 50 of same being oriented substantially radially outwards. As can be seen in FIG. 5, the peripheral edge of the nozzle 36, defining the outlet 50, may be fitted with a gasket 54 intended to bear radially against the internal surface of the external wall of the nacelle 14. The outlet 50 of the nozzle may also be covered with an exhaust grille 52 (FIGS. 1 and 2). This grille 52 may be carried by a removable cover of the external wall of the nacelle 14.

The six aforementioned elements of the heat exchanger 24 form an integral unit in this case. In the example shown, the block 34 has a parallelepiped shape and has two opposing sides (downstream and upstream) linked respectively to the nozzle 36 and to the valve 32, and two other opposing sides linked respectively to the collectors 38, 40. The dimension of the block 34 between the collectors 38, 40, determines the hot length of the primary circuit, and the dimension of the block 34 between the valve 32 and the nozzle 36 determines the cold length of the secondary circuit.

As explained above, the propulsion units 10, 12 located on either side of the fuselage of an aircraft have identical casings 16. In FIG. 3, the heat exchanger 24 has a scoop 30 that is attached to one of the panels 18 of the casing 16 such that the propulsion unit fitted with this casing has the configuration shown in FIG. 1. If the heat exchanger 24 and the panel 18 of same are mounted level with the other opening in the casing 16 of FIG. 3, the propulsion unit fitted with this casing has the configuration shown in FIG. 2.

The plane P shown in FIGS. 1 and 2 is a vertical plane passing through 12 o'clock (by analogy with the dial of a clock—reference sign 60 in FIG. 4) of the propulsion unit. The openings and the panels 18 are located on either side of this plane P, which means that the heat exchanger 24 can be mounted on either side of this plane, i.e. on the right hand side or on the left-hand side of the propulsion unit. This makes it possible to mount the heat exchanger 24 of a propulsion unit on the fuselage side of the aircraft such that the exhaust grille 52 of same (FIGS. 1 and 2) is located on the fuselage side and is therefore not visible in particular when the aircraft is viewed from the side.

Figure 7:
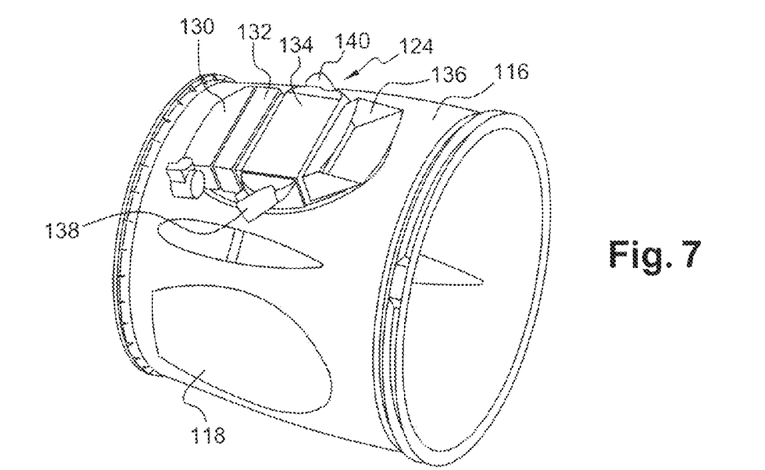
Figure 8:
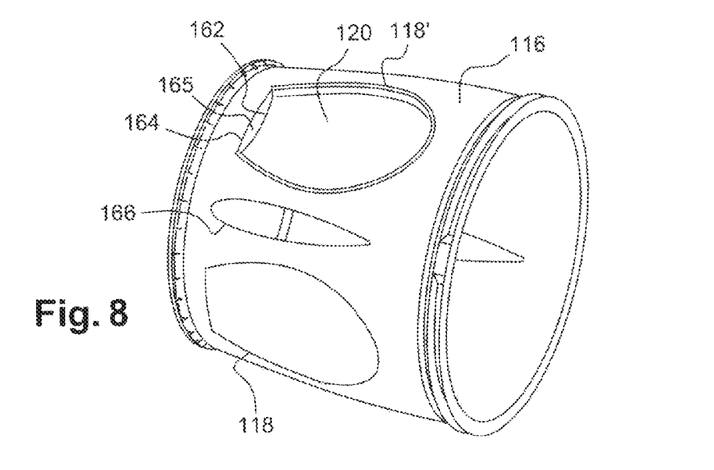
Figure 9:
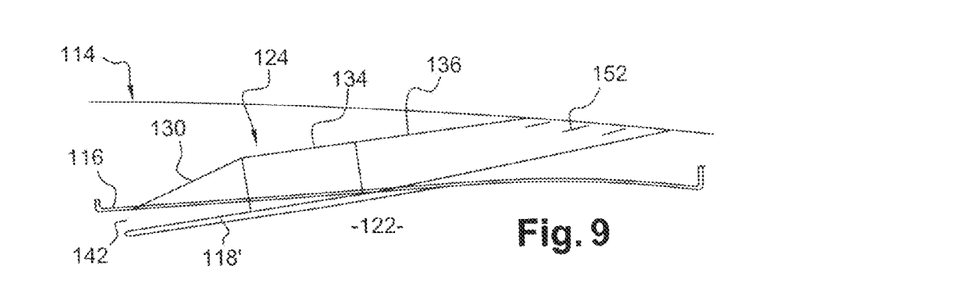
FIG. 9 is a schematic axial cross section of a heat exchanger.

FIGS. 7 to 9 show an alternative embodiment of the invention in which the heat exchanger 124 is partially embedded in the casing 116 of the engine.

The heat exchanger 124 includes the same elements as the heat exchanger 24 as described above, namely a scoop 130, a valve 132, a heat exchange block 134, a nozzle 136 and collectors 138, 140.

In the example shown, portions of the scoop 124 and of the block 134 of the heat exchanger 124 are embedded in the casing 116 and protrude radially into the casing 116. These protruding portions are therefore located in the flow path 122 of the secondary flow of the propulsion unit. The inlet 142 of the scoop 126 opens out mainly axially upstream. The outlet of the nozzle 136 is in this case fitted with an exhaust grille 152.

In this variant, although the openings in the casing 116 are substantially identical, the panels 118, 118' closing these openings are different. The panel 118 reproduces the general shape of the casing 116 such as to faithfully reconstitute the internal surface of the casing delimiting the flow path, while the panel 118' carrying the heat exchanger 124 defines a recess 120 of the type mentioned above. Since a single panel (the one intended to be fitted with a component) forms a recess, the whole comprising the casing and the removable panels defines a single recess in the flow path, which limits the aerodynamic impact. Moreover, this simplifies the shape and therefore construction of the casing, which no longer includes recesses. Specifically, the casing 116 may be made of a metal alloy, and formed by casting.

The panels 118, 118' for example have a substantially ovoid shape. Naturally, the shape of the panels depends on the shape of the equipment to be installed. The peripheral edge of the panel 118 is attached sealingly to the peripheral edge of an opening of the casing and the peripheral edge of the panel 118' is attached sealingly to the peripheral edge of the other opening of the casing, except at the upstream extremity of same. Indeed, the peripheral edge 162 of the upstream extremity of the panel 118' is offset radially inwards in relation to the corresponding peripheral edge 164 of the opening, and defines with same an orifice 165 designed to communicate with the inlet 142 of the scoop 130 of the heat exchanger 124.

As in the case mentioned above, the panel 118' fitted with the heat exchanger 124 can be used to close (in this case partially) either one of the openings in the casing 116.

In the example shown, the openings in the casing 116 are located on either side of an orifice 166 of the casing 116 assembled at 12 o'clock as mentioned above. The heat exchanger 124 can therefore be positioned on either side of 12 o'clock, as mentioned above.

Operation of the volume heat exchanger 24, 124 is identical to the prior art, supplying air to an aircraft via a pre-cooler. The invention notably obviates the need for attachment systems (flanges, bosses, clevises, etc.) for each possible position of the equipment. Consequently, the invention simplifies and streamlines the casing and helps to limit aerodynamic losses caused by any widening in the flow path as a result of equipment being too large to fit in the annular space between the casing and the nacelle.

It is understood that the invention applies equally to equipment not so large as to require a widening in the flow path of the secondary flow of a dual-flow propulsion unit, and also applies to air/air or air/oil surface heat exchangers, which by definition do not require an air inlet scoop.

The panel carrying the heat exchanger can define a relatively small recess within the casing, just large enough to form, on the flow path side, and aerodynamic surface with an opening to receive the heat exchanger. Aerodynamic surface means a surface formed such as to prevent any disruption in the air flow passing over the surface in the flow path.

Figure 10:
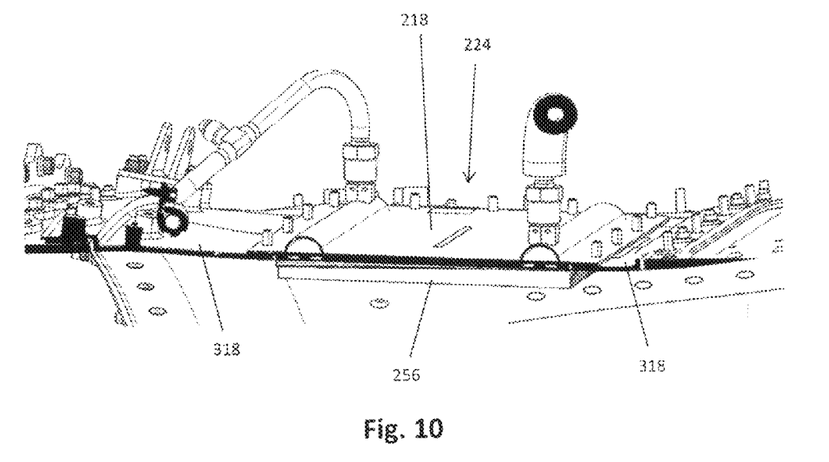
FIGS. 10 to 12 are schematic perspective views of another heat exchanger.
Figure 11:
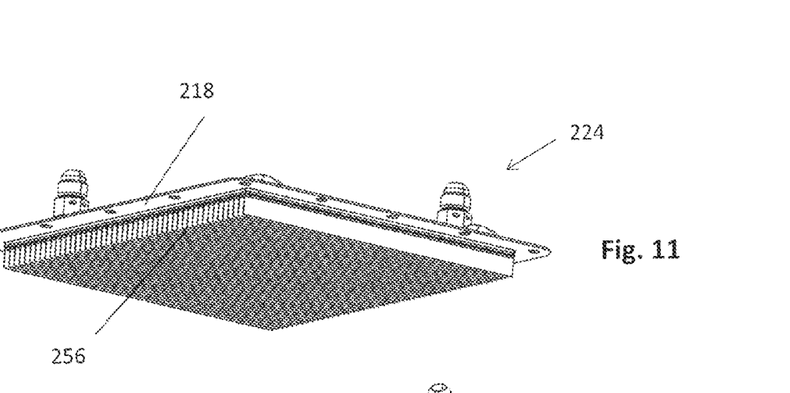
Figure 12:
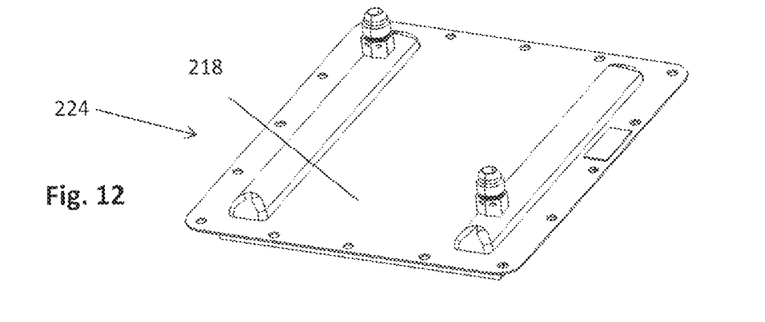

As shown in FIGS. 10 to 12, the panel 318 comprises an aperture, which is for example rectangular, enables installation of a heat exchanger 224 in the form of a surface heat exchange plate 218 that closes the opening and of which the surface on the flow-path side is continuous with the aerodynamic surface of the panel. The heat exchange plate 218 is provided with fins 256 perpendicular to the plate and parallel to the direction of the flows in the flow path, i.e.

protruding into the flow path, such as to increase the heat exchange compared to a simple plate. The plate 218 may be flat to facilitate the manufacture of same. Alternatively, a plate shaped around the curve of the generator of a semicircle of the same radius as the casing is possible if a casing with no recesses is required.

The invention claimed is:

1. A dual-flow aircraft propulsion unit comprising:
an engine;
a nacelle including an axisymmetric casing delimiting an air flow path; and
at least one pre-cooler heat exchanger for supplying air to the aircraft, wherein the pre-cooler heat exchanger includes an air scoop for drawing air from a secondary flow of the dual-flow propulsion unit and a flow adjustment valve, mounted downstream of the air scoop,
wherein said casing has at least two openings,
wherein each of the openings being closed by a removable and interchangeable panel, and
wherein the at least one pre-cooler heat exchanger is attached to a respective one of the removable and interchangeable panels.

2. The propulsion unit as claimed in claim 1, wherein the openings are located substantially in a single transverse plane, the transverse plane oriented transverse to a longitudinal axis of the casing, the openings being offset in relation to one another by a predetermined angle in relation to the longitudinal axis of the casing.

3. The propulsion unit as claimed in claim 1, wherein the openings are located in a recesses of the casing.

4. The propulsion unit as claimed in claim 1, wherein at least one of the panels forms the recesses for the pre-cooler heat exchanger.

5. The propulsion unit as claimed in claim 4, wherein the panel carrying the pre-cooler heat exchanger, on the side of the flow path, an aerodynamic surface provided with an opening, and wherein the component is a pre-cooler heat exchanger including a surface heat exchange plate that closes the opening and of which the surface on the flow path side is continuous with said aerodynamic surface.

6. The propulsion unit as claimed in claim 1, wherein the air scoop is attached to one of the panels.

7. The propulsion unit as claimed in claim 6, wherein the scoop is partially embedded in the casing or the panel and includes a protruding portion on the internal surface of the casing or the panel.

8. The propulsion unit as claimed in claim 1, wherein the openings are substantially identical.

9. A system for a propulsion unit as claimed in claim 1, including the pre-cooler heat exchanger and the two removable panels designed to close the openings of the axisymmetric nacelle casing, characterized in that the pre-cooler heat exchanger is rigidly attached to one of said panels.

10. An aircraft propulsion unit comprising:
an engine;
a nacelle including an axisymmetric casing delimiting an air flow path; and
at least one pre-cooler heat exchanger,
wherein said casing has at least two openings, each of the openings being closed by a removable and interchangeable panels,
wherein at least one of the panels carry the pre-cooler heat exchanger on the side of the flow path, and an aerodynamic surface being provided with the openings, and
wherein the pre-cooler heat exchanger includes a surface heat exchange plate that closes the opening and of which the surface on the flow-path side is continuous with the aerodynamic surface of the panel.

* * * * *